(12) United States Patent
Baba et al.

(10) Patent No.: US 8,620,642 B2
(45) Date of Patent: Dec. 31, 2013

(54) APPARATUS AND METHOD FOR LINGUISTIC SCORING

(75) Inventors: Daisuke Baba, Westminster, CO (US); Charles Douglas Phillips, Littleton, CO (US)

(73) Assignee: Trustwave Holdings, Inc., Chicago, IL (US)

( * ) Notice: Subject to any disclaimer, the term of this patent is extended or adjusted under 35 U.S.C. 154(b) by 0 days.

(21) Appl. No.: 13/535,332

(22) Filed: Jun. 27, 2012

(65) Prior Publication Data

US 2012/0271626 A1  Oct. 25, 2012

Related U.S. Application Data

(63) Continuation of application No. 12/233,323, filed on Sep. 18, 2008, now Pat. No. 8,234,328, which is a continuation of application No. 10/748,677, filed on Dec. 31, 2003, now Pat. No. 7,613,766.

(51) Int. Cl.
*G06F 17/27* (2006.01)

(52) U.S. Cl.
USPC ............... 704/9; 704/257; 704/251; 704/255

(58) Field of Classification Search
USPC ........... 704/1–10, 251, 255, 257, 270, 270.1; 713/200
See application file for complete search history.

(56) References Cited

U.S. PATENT DOCUMENTS

2002/0004907 A1 * 1/2002 Donahue ..................... 713/200

* cited by examiner

*Primary Examiner* — Huyen X. Vo
(74) *Attorney, Agent, or Firm* — Hanley, Flight & Zimmerman, LLC

(57) ABSTRACT

In embodiments of the invention, a system receives selections from a user based on a list of pre-defined monitoring categories and/or optionally receives custom category definitions from the user. The option for custom category definitions may be advantageous due to the flexibility provided to a system administrator or other user. In embodiments of the invention, the pre-defined and/or custom monitoring categories may be or include complex hierarchical behavior. Such an approach provides monitoring algorithms that can achieve improved accuracy compared to known methods. In embodiments of the invention, the order of computations used in resolving a monitoring category may be re-ordered, statically and/or dynamically, to improve the efficiency of monitoring operations.

12 Claims, 10 Drawing Sheets

| IP = 123.45.678.910 | 1ST TRIGGER SCORE > 0 | 2ND TRIGGER SCORE > 0 | CATEGORY RESULT |
|---|---|---|---|
| YES | YES | YES | HIT |
| YES | YES | NO | HIT |
| YES | NO | YES | HIT |
| YES | NO | NO | NON-HIT |
| NO | YES | YES | NON-HIT |
| NO | YES | NO | NON-HIT |
| NO | NO | YES | NON-HIT |
| NO | NO | NO | NON-HIT |

APPARATUS AND METHOD FOR LINGUISTIC SCORING

RELATED APPLICATION AND COPYRIGHT

The present application claims priority to U.S. patent application Ser. No. 10/748,677 filed Dec. 31, 2003 and issued Nov. 3, 2009 as U.S. Pat. No. 7,613,766 and U.S. patent application Ser. No. 12/233,323 filed Sep. 18, 2008 and issued Jul. 31, 2012 as U.S. Pat. No. 8,234,328, which are incorporated herein in their entirety by this reference. With regard to copyrights, a portion of the disclosure of this patent document contains material that is subject to copyright protection. The copyright owner has no objection to the facsimile reproduction by anyone of the patent disclosure, as it appears in the U.S. Patent & Trademark Office patent files or records, but otherwise reserves all copyright rights whatsoever.

FIELD OF THE DISCLOSURE

This disclosure relates to linguistic analysis. In particular, but not by way of limitation, this disclosure relates to systems and methods for scoring textual data based on relevance of the textual data to one or more pre-defined and/or custom categories.

BACKGROUND

Network-based communications, for example those enabled by the Internet, have made available a wide variety of data to network users. But all data types may not be appropriate for all user types. For example, a parent may seek to protect their children from pornographic Web sites, and an employer may seek to prevent hate speech or other categories of communications within their private enterprise. Accordingly, systems and methods have been developed to monitor network-based communications so that access to such data can then be blocked or reported, for example.

Known systems and methods for monitoring data communications have many disadvantages, however. For instance, methods that function based on simple keyword searches typically produce false positives and/or other inaccurate results. Moreover, methods that employ more complex searching algorithms may require large overhead in terms of resources and processing time, resulting in delayed or otherwise ineffective operation.

Better techniques are needed for data monitoring that allow for the application of more accurate monitoring algorithms in a more computationally-efficient manner.

SUMMARY

In some embodiments, a system receives selections from a user based on a list of pre-defined monitoring categories and/or optionally receives custom category definitions from the user. The option for custom category definitions may be advantageous due to the flexibility provided to a system administrator or other user. In some embodiments, the pre-defined and/or custom monitoring categories may be or include complex hierarchical behavior. Such an approach provides monitoring algorithms that can achieve improved accuracy compared to known methods. In some embodiments, the computations used in resolving a monitoring category may be re-ordered, statically and/or dynamically, to improve the efficiency of monitoring operations.

Exemplary embodiments of the invention shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

BRIEF DESCRIPTION OF THE DRAWINGS

Various objects, advantages, and a more complete understanding of the invention are apparent and more readily appreciated by reference to the following Detailed Description and to the appended claims when taken in conjunction with the accompanying Drawings wherein:

FIG. 8B is an illustration of an example truth table for performing linguistic analysis.

DETAILED DESCRIPTION

This section begins with a description of a functional architecture for monitoring a data source, then provides a top-level process flow for performing linguistic scoring on the monitored data source. Scoring, as used herein, refers to the underlying computations required in determining whether a category is a hit (e.g., whether or not the data source has been resolved to be within a particular category). Scoring is then described as a complex aggregate behavior, where, for example, a category definition may include multiple pre-requisite triggers. As used herein, a trigger is a regular expression (regex) or other code that performs a textual search function. Accordingly, a discussion is provided on how such linguistic triggers may be aggregated, how such triggers may be constructed, and how complex aggregated behavior may be simplified. The discussion of threshold scoring includes a description of static re-ordering of pre-requisite triggers to improve scoring efficiency. Exemplary embodiments are also provided for Boolean logic scoring behavior using two or more pre-requisite triggers. The detailed description concludes with a discussion of dynamic re-ordering of pre-requisite triggers, which may be applied to Boolean scoring behavior and/or threshold scoring behavior as another way to improve the efficiency of linguistic scoring.

While sub-headings are used in this section for organizational convenience, the disclosure of any particular feature(s) is/are not necessarily limited to any particular section or sub-section of this specification. The detailed description begins with the functional architecture.

Functional Architecture

Figure 1:
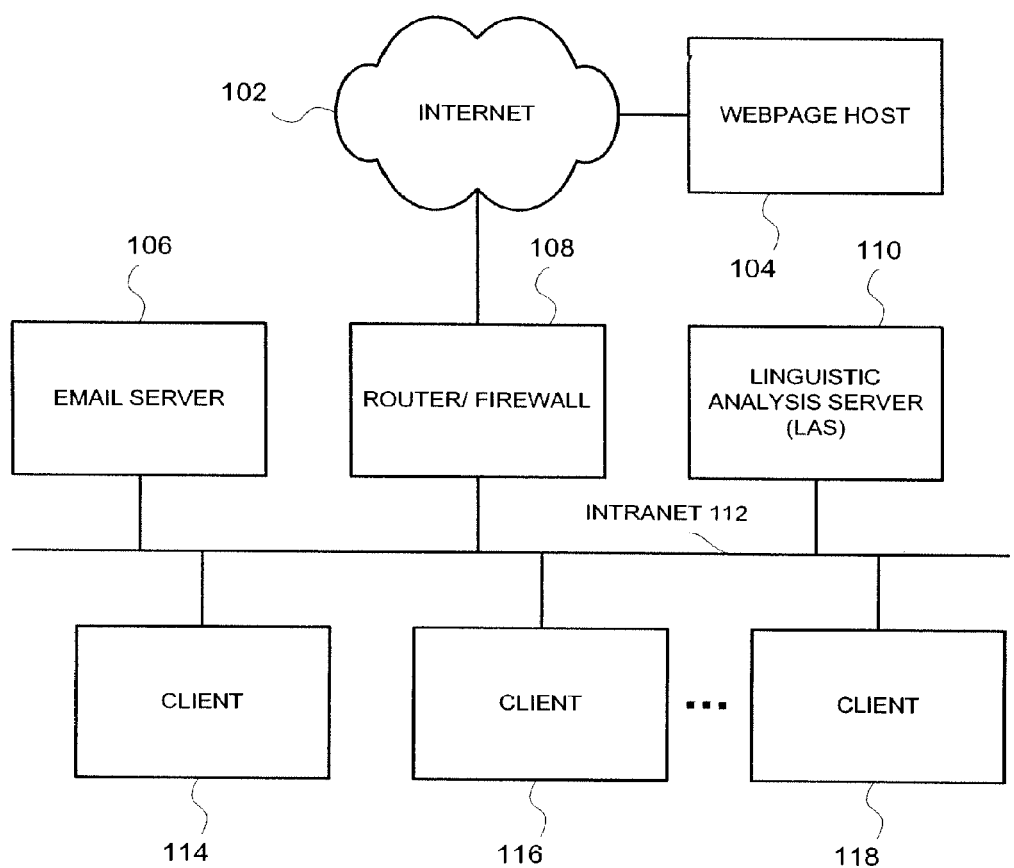
FIG. 1 is a disclosed example of an architecture for a linguistic analysis system.

FIG. 1 illustrates a disclosed example functional architecture for a linguistic analysis system. As shown therein, a linguistic analysis system includes an Internet 102, a Web page host 104, an email server 106, a router/firewall 108, a Linguistic Analysis Server (LAS) 110, an intranet 112, and network clients 114, 116 and 118.

The email server 106, router/firewall 108, LAS 110, and clients 114, 116 and 118 are coupled to the intranet 112, and the Internet 102 is coupled to the router/firewall 108 and the Web page host 104.

In operation, the LAS 110 monitors data communications on intranet 112 associated with one or more clients 114, 116 and/or 118. For example, the LAS 110 may be configured to monitor email communications, chat, instant messaging (IM), point-to-point (P2P) communications, File Transfer Protocol (FTP) communications, and/or URL-based Web browser communications. In addition, communications monitored by the LAS 110 may be communications local to the intranet 112 and/or between any one of clients 114, 116, and 118 and the Internet 102, for example.

The LAS 110 may be or include, for example, a computer having an Intel 3 GHz processor, 2 GB of Random Access Memory (RAM), a 120 GB hard drive, a Compact Disc Read-Only Memory (CD ROM), and a Red Hat Linux Operating System (OS). The clients 114, 116, and/or 118 may be or include, for example, a personal computer, a Personal Data Assistant (PDA), a Web-enabled telephone, or other networkable user interface device.

Various architecture alternatives are possible in addition to the one depicted in FIG. 1. For example, Internet 102, Webpage Host 104, email server 106 and router/firewall 108 are optional system components. Further, intranet 112 and/or Internet 102 may be replaced, for example, by a Local Area Network (LAN), Wide Area Network (WAN), or other wired or wireless network configuration. In addition, the LAS 110 may only monitor traffic local to the intranet 112, or only between, for example, clients 114, 116, and 118 and the Internet 102. Moreover, in alternative embodiments, the functionality of LAS 110 may reside in, for example, email server 106, router/firewall 108, and/or in each of the clients 114, 116, and 118.

The linguistic analysis processes described below with reference to FIGS. 2, 3, and 6-9 may be implemented with computer-executable code. Moreover, such code may be stored on a CD ROM, hard drive, or other data storage medium and/or loaded into RAM for execution by a processor. For example, code for performing the processes described herein may be stored in the 120 GB hard drive of the LAS 100, loaded into the RAM of the LAS 110, and executed by the 3 GHz processor of the LAS 110.

Top-Level Process Flow

Figure 2:
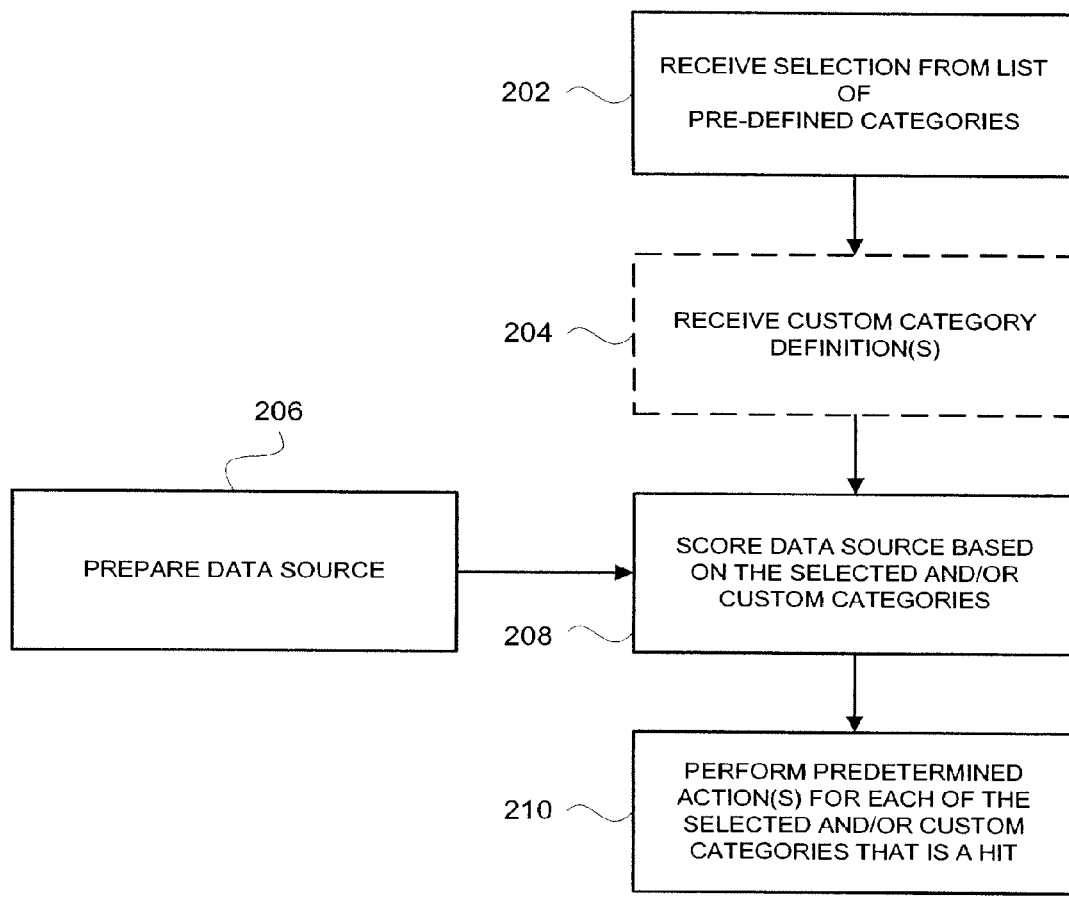
FIG. 2 is a process flow diagram of an example method for performing linguistic analysis.

FIG. 2 is a process flow diagram of a disclosed example method for performing linguistic analysis. FIG. 2 is depicted from the perspective of LAS 110. As shown therein, the process begins by receiving a selection from a list of predefined categories in step 202. The predefined categories may be, for instance, categories such as: adult, confidential, conflict, gambling, games, merger and acquisition, racism, resignation, shopping, sports, substance abuse, stock trading, and/or other predefined data category. A system administrator or other user of LASD 110 may select the predefined categories based on an Approved Usage Policy (AUP) for a corporation, or based other criterion.

Next, in step 204, the LAS 110 optionally receives a custom category definition. A custom category definition may be based on one or more of the predefined categories. For example, in the case where a user has selected the predefined category of mergers and acquisitions, a user may further specify that when a hit is resolved for the predefined category of mergers and acquisitions, a custom category is resolved based on a particular company name. Accordingly, the form of a custom category definition may include both search criteria (e.g., a particular company name) and a link to a selected category (e.g., mergers and acquisitions).

Then, in step 206, the LAS 110 prepares the data source for analysis. Step 206 may include collecting data from a data stream, a file system, database, or other data source. Step 206 may further include, in combination with, or in the alternative to collecting data, partitioning the data into sessions, groups of sessions, or other logical group(s) for analysis. For example, in step 206, LAS 110 may collect an email correspondence and its reply from email server 102 for linguistic scoring.

Next, in step 208 the LAS 110 performs scoring of input data sources resulting from step 206 against the selected predefined categories and/or custom categories received in steps 202 and 204, respectively.

Finally, in step 210, the system performs predetermined action(s) for each of the selected and/or custom categories that is resolved as a hit (also referred to herein as resolved-positive). Such action may include, for instance, blocking a URL, alerting an administrator via email, pager, or Simple Network Management Protocol (SNMP) trap, or logging data for later review by a system administrator, manager, or other user.

Linguistic Triggers

As mentioned above, a trigger is a regular expression (regex) or other code that performs a textual search function. A category is a named trigger. Triggers and/or categories can be arranged into a hierarchy of complex aggregate behavior, as illustrated in FIG. 3 and described below.

Figure 3:
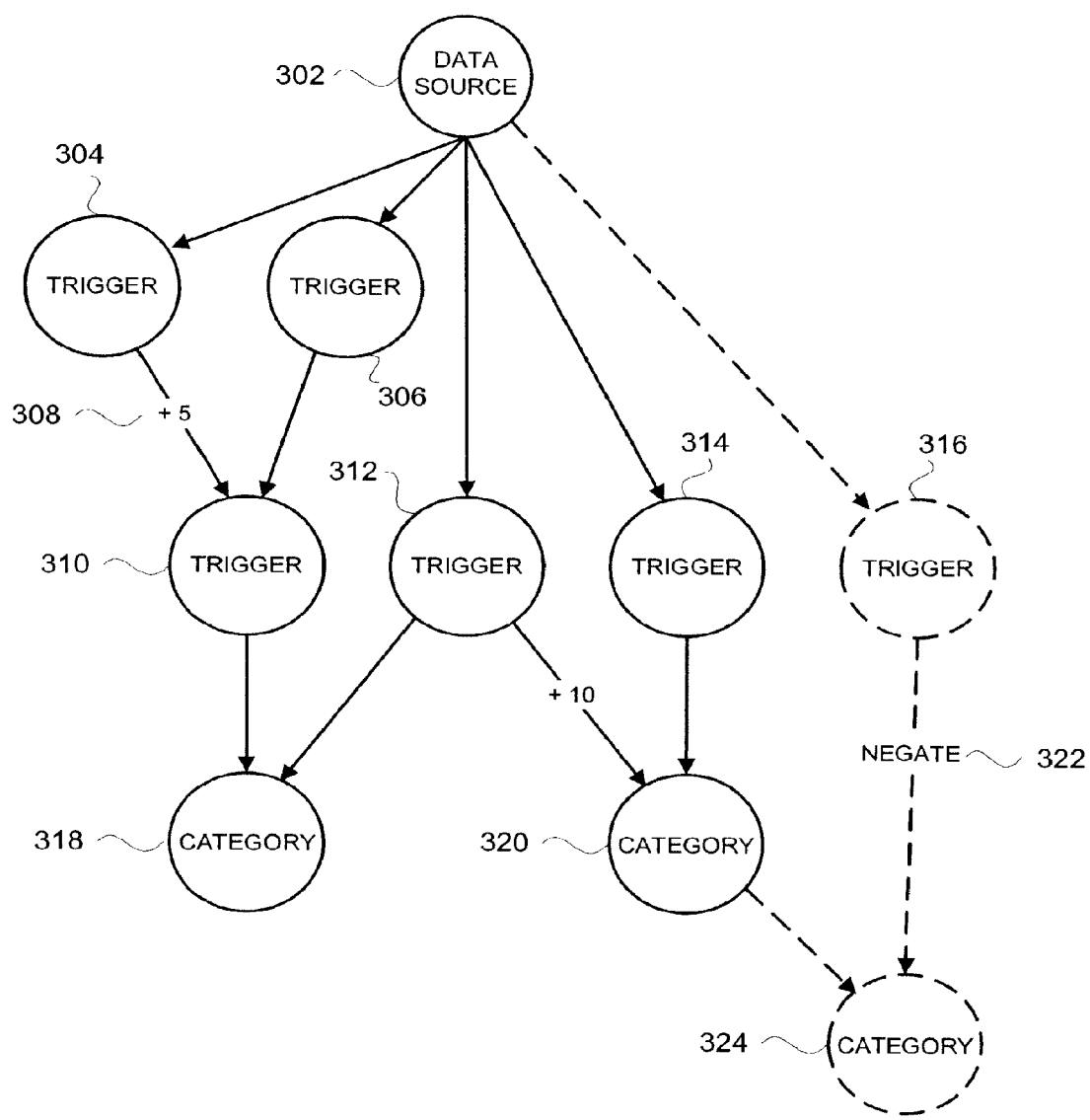
FIG. 3 is a process flow diagram of an example method for performing linguistic analysis.

FIG. 3 is a process flow diagram of a disclosed example method for performing linguistic analysis. As shown therein, data source 302 is a pre-requisite for resolution of triggers 304, 306, 312, 314, and 316. Moreover, Triggers 304 and 306 are pre-requisite triggers (or contained triggers) for containing trigger 310. Likewise, triggers 310 and 312 are pre-requisite triggers for category 318, triggers 312 and 314 are pre-requisite triggers for category 320, and category 320 and triggers 316 are pre-requisite triggers for category 324.

A predefined score is associated with each trigger. When a contained trigger is resolved as a hit, the scores of all contained triggers are used in resolving the containing trigger. For example, if both triggers 310 and 312 are resolved positive (determined to be as a hit), then category 318 would be resolved using the predefined scores from triggers 310 and 312.

FIG. 3 illustrates that a score may be modified in resolving a containing trigger. For example, if trigger 304 is resolved as a hit, then the score associated with trigger 304 is increased by 5, as illustrated by addition operator 308, in resolving trigger 310. The effect of addition operator 308 is to add increased importance to trigger 304 in resolving trigger 310. In the alternative, or in combination with addition operators, subtraction, multiplication, and/or division operators could be used to similar effect.

The addition operator 308 is a property of the containing trigger 310. The reason for this is more apparent when considering the relative importance of trigger 312 in FIG. 3: if trigger 312 is a hit, its score is not modified in resolving category 318, but is increased by 10 in resolving category 320.

Another way that a score can be modified is with a negation operator. In the illustrated example, where trigger 316 is resolved as a hit, the score associated with trigger 316 is negated by negation operator 322 in resolving category 324. Like the addition operator, the negation operator is a property of the containing trigger.

Trigger 316, category 324, and associated links are illustrated in dashed lines to indicate that category 324 may be a custom category rather than a predefined category.

Figure 4:
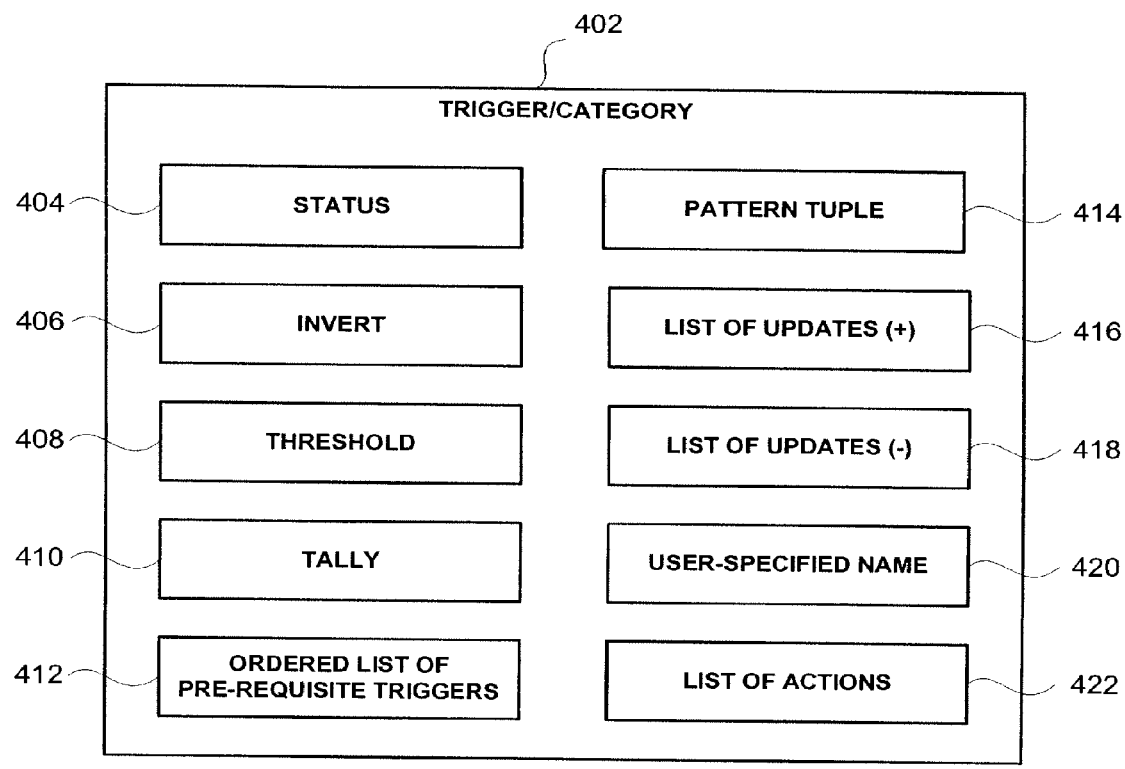
FIG. 4 is a schematic diagram of an example trigger.

FIG. 4 is a schematic diagram of an example trigger. As shown therein, a trigger may include status data 404, invert data 406, threshold data 408, tally data 410, an ordered list of pre-requisite triggers 412, a pattern tuple 414, a list of triggers that are potentially updated if the status of the current triggers becomes resolved-positive 416, a list of triggers that are potentially updated if the status of the current trigger becomes resolved-negative 418, a user-specified name (e.g., a category name) 420 and a list of actions 422 if the category is resolved positive.

Status data 404 may be unresolved, resolved-positive, or resolved-negative. The effect of the resolved status may be inverted according to invert data 406.

Threshold data 408 is a predetermined number that may be used to resolve a trigger. For example, if a containing trigger has a threshold of 5, and the only pre-requisite trigger has been resolved positive and has a score of 6, then the threshold of the containing trigger has been exceeded, and the containing trigger is resolved-positive.

The tally 410 is a parameter (e.g., a running total) that reflects the effect of all pre-requisite triggers that have been considered in resolving the containing trigger. The ordered list of pre-requisite triggers 412 provides information about the contained triggers (used if the status of the containing trigger is unresolved), and will be described in more detail with reference to FIG. 5 below.

Pattern Tuple 414 includes a reference to a particular pattern-evaluation engine. Potential pattern-evaluation engines include regular expression engines, string matchers, numeric and character comparisons, IP-in-network/netmask-range, "always true" and "always false". Pattern Tuple 414 may further include a reference to some data. This may be "raw" data, the result of applying transformations to the raw data, or data related to the raw data. One example transformation is converting all uppercase letters to lowercase. Related data includes the length of the data. If the data is extracted from network traffic, related data may also include the IPs of the involved hosts or information associated with the IPs of the involved hosts. If the data is extracted from a file system, related data may also include the name of the file, permissions of the file, and owner(s) of the file. In addition, evaluation of a pattern tuple may generate more data that subsequently may be used in other pattern tuples. This additional data, which may also be included in pattern tuple 414, may include a number of times the pattern matched, offsets from the beginning of the data to the beginning or end of matched data, etc.

The list of triggers that are potentially updated if the status of the current trigger becomes resolved-positive 416 is self-descriptive. As an illustration with reference to FIG. 3, trigger 312 would include category 318 and category 320 in list 416.

The list of triggers that are potentially updated if the status of the current trigger becomes resolved-negative 418 is also self-descriptive. Such cases may arise, for instance, where the data is inverted. For example, consider a gambling trigger containing a news story pre-requisite trigger, where the new story pre-requisite trigger has invert data 406. In this case, the gambling trigger is only evaluated if the news trigger is not a hit. The effect is that gambling is not scored for news stories related to gambling.

It should be noted that all of the data illustrated as part of trigger/category 402 in FIG. 4 and described above are optional.

Complex aggregate behavior models may be simplified with reference to data included in trigger/category 402. For example, two or more triggers containing the same pattern tuple may be collapsed into exactly one trigger so a pattern tuple is never evaluated more than once. In this instance, resolved-positive output lists 416 and resolved-negative output lists 418 are appended. Further, one or more triggers containing an identical list of prerequisite triggers 504, respective scores 506, and respective negate statuses 406 may be collapsed into exactly one trigger so the list is never evaluated more than once.

As another example of computational simplification, the system may be configured so that only categories having at least one action 422 (and all prerequisite triggers of such categories) are loaded into RAM and/or resolved. Thus, with reference to FIG. 3, if categories 320 and 324 each included actions 422, but category 318 did not include any actions 422, then trigger 304, trigger 306, trigger 310, and category 318 would not be loaded into RAM and/or would not be resolved.

Figure 5:
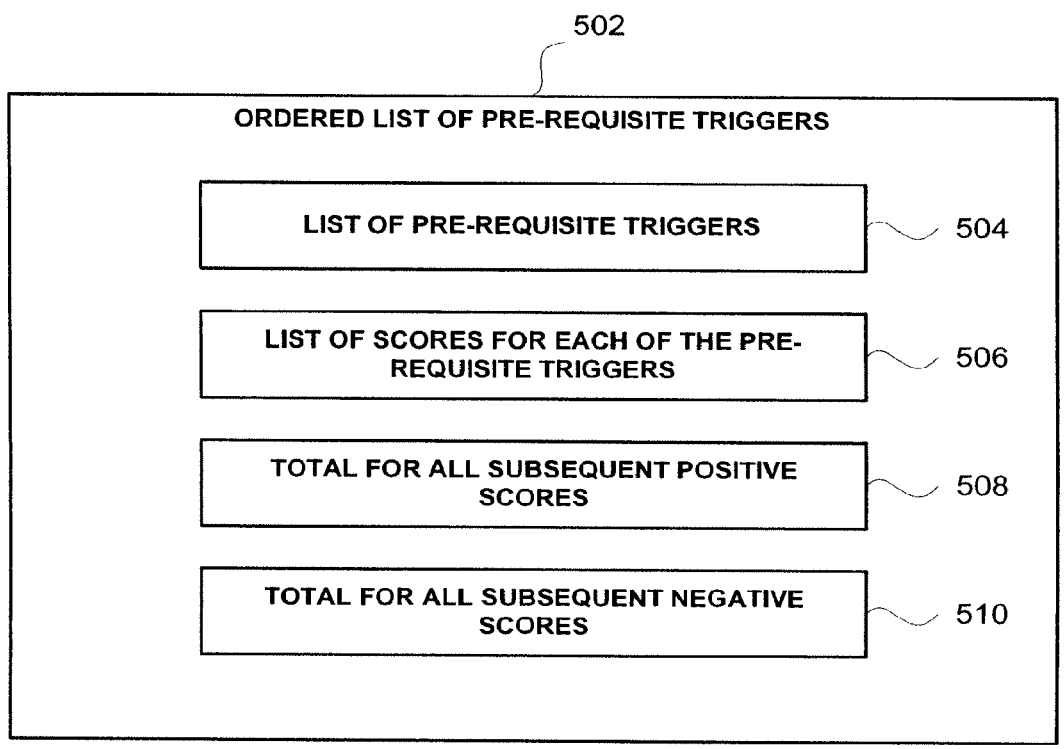
FIG. 5 is a schematic diagram of an example ordered list of pre-requisite triggers.

FIG. 5 is a schematic diagram of an example ordered list of example pre-requisite triggers. As shown therein, an ordered list 502 includes a list of prerequisite triggers 504, a list of scores for each of the prerequisite triggers 506, a total for all subsequent positive scores 508, and a total for all subsequent negative scores 510.

Threshold Scoring

Figure 6:
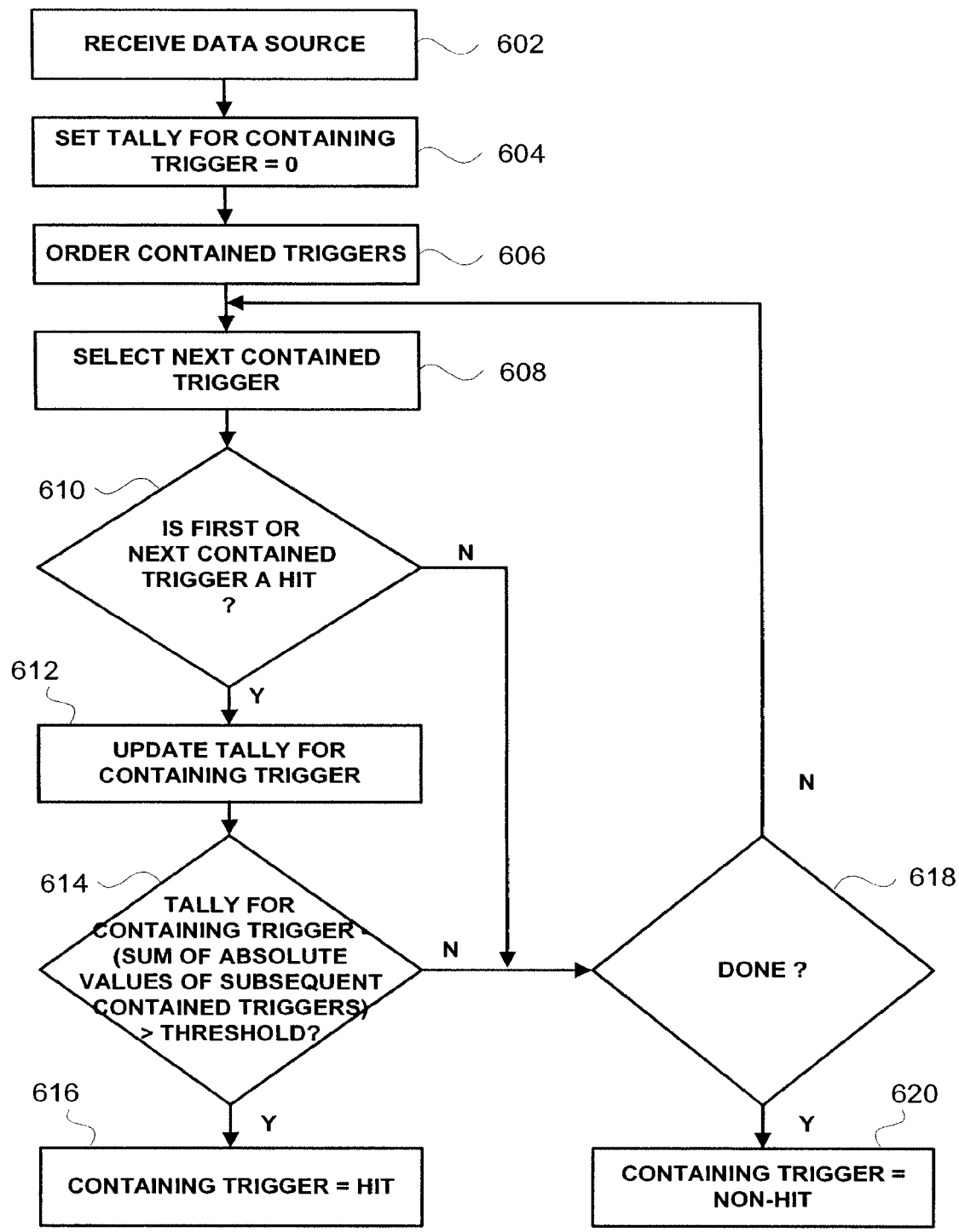
FIG. 6 is an example process flow diagram of a method for performing linguistic analysis.

FIG. 6 is a process flow diagram of an example method for performing linguistic analysis. To illustrate the operation of the process in FIG. 6, consider a containing trigger having three pre-requisite triggers: trigger A is associated with a score of −2, triggers B is associated with a score of +1, and trigger C is associated with a score of +13.

The process begins in step 602 with receiving a data source. Next, in step 604, the tally for a containing trigger is set equal to zero. Then, in step 606, the system orders contained triggers based on decreasing absolute value of scores. In the example presented, the contained triggers would be ordered: C, A, and B in step 606. The system may execute step 606 using the list of prerequisite triggers 504 and the list of scores for each of the prerequisite triggers 506. Step 606 is an example of static re-ordering of triggers within a complex aggregate behavior.

In step 608, the process selects the first or next trigger (in the preceding example, trigger C would be selected first).

In conditional step 610, it is determined whether the first or next contained trigger is a hit. If conditional step 610 is affirmative, the process advances to step 612 to update the tally for the containing trigger. Thus, if trigger C were to be resolved positive, then the tally for the containing trigger would be 13 (since 0+13=13).

Then, in conditional step 614, it is determined whether the tally for the containing trigger—(the sum of absolute values of subsequent contained triggers) is >a predetermined threshold. Thus, if the predetermined threshold were 5, then the result of conditional step 614 would be positive (since the sum of the absolute value of subsequent contained triggers would be 3, and since 13−3=10, and since 10 is >5). In this instance, the containing trigger is a hit (resolved positive) in step 616. Note that conditional step 614 may be calculated using the total for all subsequent positive scores 508, and the total for all subsequent negative scores 510.

Where the result of conditional steps 610 or 614 are in the negative, however, the process advances to conditional step 618 where it is determined whether the process is done. In other words, in step 618, it is determined whether all contained triggers have been evaluated. Where the result of conditional step 618 is in the affirmative, the process advances to step 620 where the containing trigger is identified as a non-hit (resolved negative). On the other hand, where the result of conditional step 618 is in the negative, the process advances to step 608 to select the next contained trigger (as ordered in step 606) before returning to conditional step 610.

Advantageously, step 614 operates to provide an early exit where a containing trigger can be resolved by evaluating less than all pre-requisite triggers. In addition, the effect of ordering step 606 and selection step 608 is to further improve the efficiency of a trigger having an early exit feature.

There are two special-case scores that may be added to a tally (not illustrated in FIG. 6). First, if +MAX is applied to a tally, the threshold is immediately considered to be exceeded (and the trigger is resolved positive) regardless of the total of all remaining negative scores. Second, if –MAX is applied to a tally, the threshold is immediately considered to be not-exceeded (and the trigger is resolved negative) regardless of the total of all remaining positive scores.

Boolean Logic

As an alternative to a trigger that is configured to perform a threshold comparison, a trigger may be configured to perform a Boolean logic function. In such cases, the predetermined threshold is zero.

Figure 7:
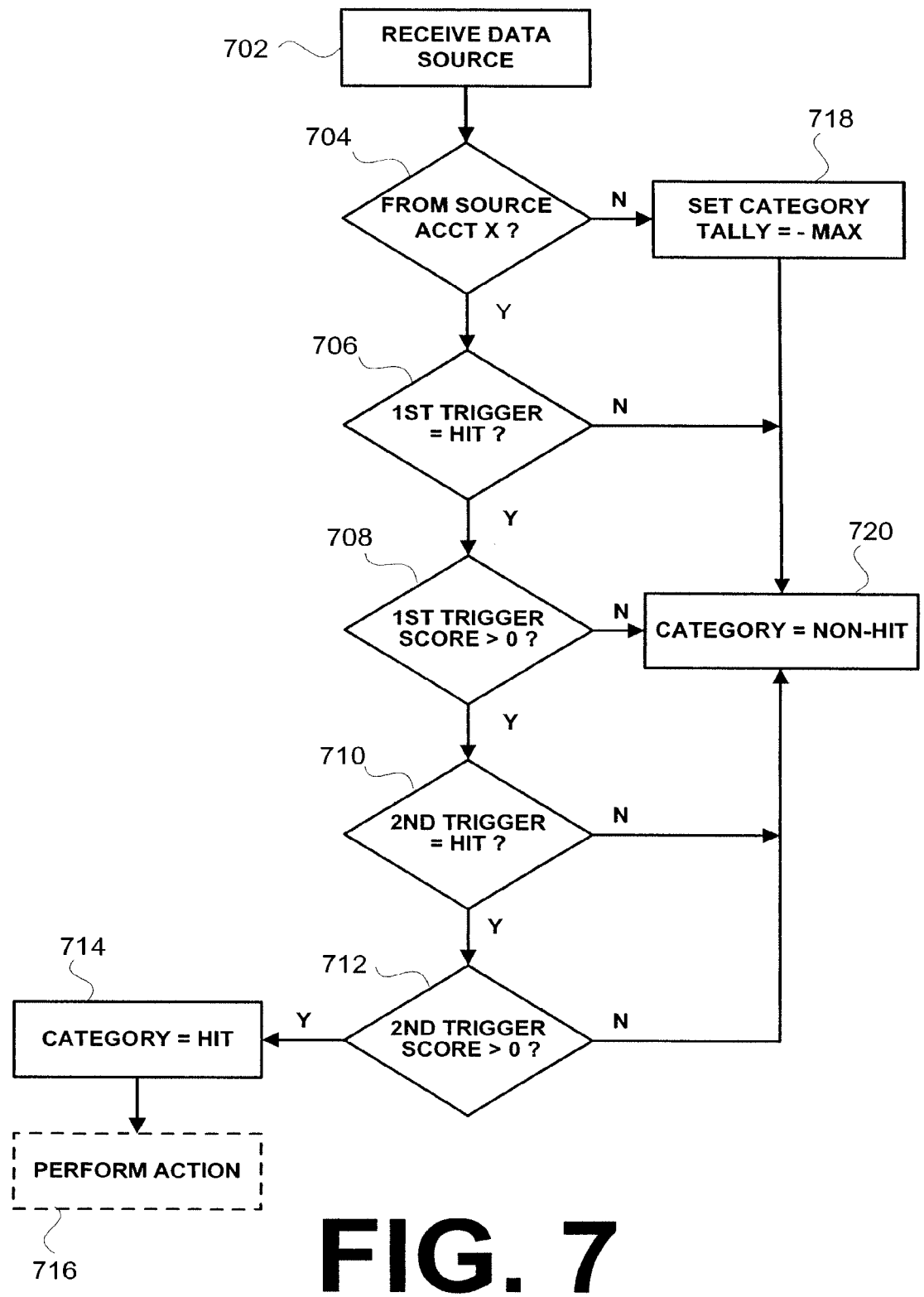
FIG. 7 is an example process flow diagram of a method for performing linguistic analysis.

FIG. 7 is a process flow diagram of an example method for performing linguistic analysis. In particular, FIG. 7 illustrates a logical AND function for a category having prerequisite triggers identified as a first trigger and a second trigger. FIG. 7 further illustrates the application of a pattern tuple.

The process begins in step 702 by receiving a data source. Next, the process advances to conditional step 704 where it is determined whether the input data source is from a particular source account X. As used herein, a source account may be an alias associated with any description of source. For example, with reference to email correspondence, a source account may be an alias associated with From, MAIL FROM, and Reply To fields. Where the result of conditional step 704 is in the negative, the process advances to step 718 where the category tally is set to –MAX, and the category is a non-hit (resolved negative) in step 720. Steps 704 and 718 may be based on a pattern tuple 414.

Where the result of conditional step 704 is in the affirmative, the process advances to step 706 where it is determined whether the first trigger is a hit. Where the result of conditional step 706 is in the affirmative, the process advances to step 708 where it is determined whether the score for the first trigger is >0. Where the result of conditional step 708 is in the affirmative, the process advances to step 710 where it is determined whether the second trigger is a hit. Where the result of conditional step 710 is in the affirmative, the process advances to step 712 where it is determined whether the score for the second trigger is >0. Where the result of conditional step 712 is in the affirmative, the category is a hit (resolved positive) in step 614 and the process will terminate with actions in step 716.

Where the result of conditional steps 706, 708, 710, or 712 are in the negative, the process also advances to step 720 indicating a non-hit of the category.

Accordingly, for the process illustrated in FIG. 7, the category is a hit only when both the first trigger and the second trigger are hits, and where their associated scores are greater than zero. FIG. 7 also illustrates that where –MAX is applied to a trigger tally, the trigger is immediately considered to be a non-hit. FIG. 7 also illustrates an early exit for the case where the first trigger is not a hit (since in this instance, the second trigger is not evaluated).

Figure 8A:
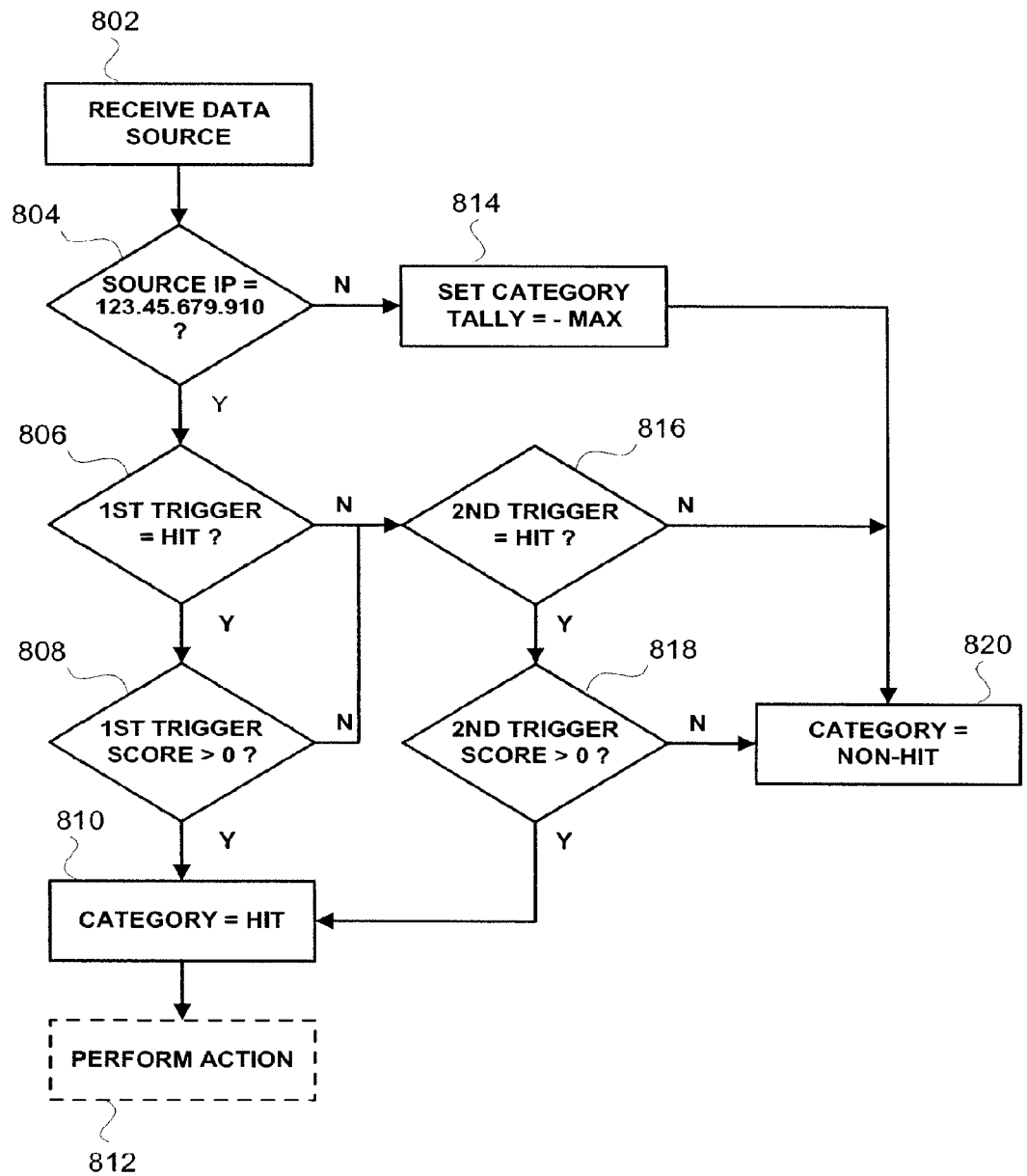
FIG. 8A is an example process flow diagram of a method for performing linguistic analysis.

FIG. 8A is a process flow diagram of an example method for performing linguistic analysis. In particular, FIG. 8A illustrates a logical OR function for a category having prerequisite triggers identified as a first trigger and a second trigger. FIG. 8A further illustrates the application of a pattern tuple.

The process begins in step 802 with receiving a data source. Next, the process advances to conditional step 804 where it is determined whether a source IP address is =123.45.678.910 in step 804. Where the result of conditional step 804 is in the negative, the process advances to step 814 where the category tally is set to –MAX, and the category is a non-hit (resolved negative) in step 820. Steps 804 and 814 may be based on a pattern tuple 414.

Where the result of conditional step 804 is in the affirmative, the process advances to conditional step 806 to determine whether the first trigger is a hit. Where the result of conditional step 806 is in the affirmative, the process advances to step 808 where it is determined whether the score for the first trigger is >0. Where the result of conditional step 806 is in the affirmative, then the process advances to step 810, indicating that the category is a hit (resolved positive). Then, in step 812, appropriate action for the category is performed.

Where the result of conditional step 806 or 808 are in the negative, the process advances to conditional step 816 to determine whether the second trigger is a hit. Where the result of conditional step 816 is in the affirmative, the process advances to step 818 to determine whether the score for the second trigger is >0. Where the result of conditional step 818 is in the affirmative, the process advances to step 810, indicating that the category is a hit. Where the result of conditional steps 816 or 818 are in the negative, the process advances to step 820, indicating that the category is a non-hit.

Thus, FIG. 8A illustrates that the category will be a hit where either the first trigger is a hit and has a score greater than zero, or where the second trigger is a hit and has a score greater than zero. FIG. 8A also illustrates that where –MAX is applied to a trigger tally, the trigger is immediately considered to be a non-hit. FIG. 8A further illustrates an early exit function, since the category is resolved positive if it is determined that the first category is a hit and has a score >0.

FIG. 8B is an illustration of an example truth table for performing linguistic analysis. In particular, FIG. 8B is a truth table for a category having a logical OR function based on $1^{st}$ and $2^{nd}$ pre-requisite triggers. The category also includes a pattern tuple that is seeking to match a particular IP address.

As Shown in FIG. 8B, column 822 indicates whether the IP address of the input data is 123.45.678.910; column 824 indicates whether the $1^{st}$ trigger score is >0; column 826 indicates whether the $2^{nd}$ trigger score is >0; and column 828 indicates whether the category result will be a hit (resolved positive) or a non-hit (resolved negative).

Triggers may include other Boolean logic operations. For example, since a result may be inverted (a logical NOT), the AND and OR functions described above may be combined to produce an Exclusive OR (XOR) function. Thus, where p and q are pre-requisite triggers, p XOR q could be implemented via the following expression: (p AND (NOT q)) OR ((NOT p) AND q).

Dynamic Re-Ordering

Figure 9:
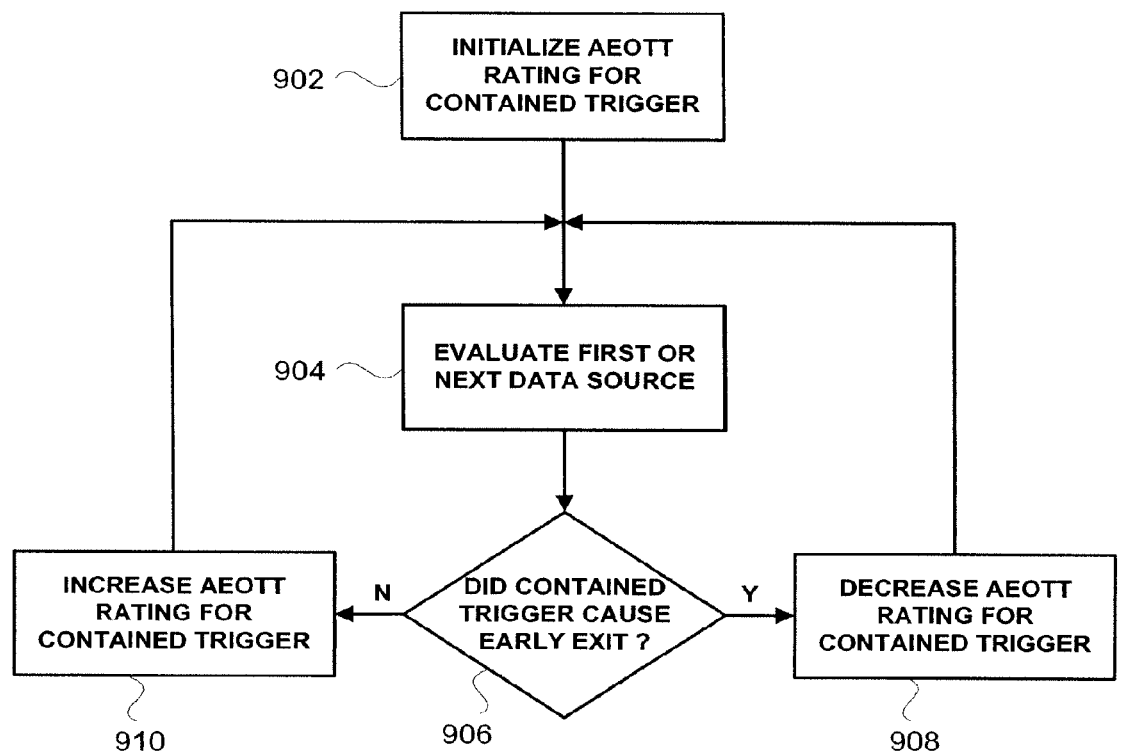
FIG. 9 is a process flow diagram for an example dynamic reordering method.

FIG. 9 is a process flow diagram for an example dynamic reordering method. As shown therein, the process begins in step 902 by initializing an Avoid Evaluation of This Trigger (AEOTT) rating. Next, in step 904, the process evaluates a first or next data source (e.g., resolves a pre-requisite trigger for the first or next data source). Then, in step 906, it is determined whether the contained trigger caused an early exit. Where the result of conditional step 906 is in the affirmative, the process advances to step 908 where the AEOTT is decreased for the contained trigger. On the other hand, where the result of conditional step 906 is in the negative, the process advances to step 910 where the AEOTT is increased for the contained trigger. After either step 908 or step 910, the process returns to step 904 to evaluate a next data source.

Accordingly, the process in FIG. 9 illustrates that an AEOTT rating can be either incremented or decremented based on whether it is determined in step 906 that the contained trigger caused an early exit. For example, with reference to FIG. 7, where a higher AEOTT causes a pre-requisite trigger to be evaluated later, and where it is determined that the first trigger did not cause an early exit, the AEOTT rating for the first trigger would be increased. Over time, the result is that the trigger most likely to cause an early exit (a non-hit in the case of an AND function) will be evaluated prior to other pre-requisite triggers.

Although described above with reference to triggers having logical functions, adaptive reordering could be applied to pattern tuples. Moreover, adaptive or dynamic reordering could be applied to threshold scoring in combination with, or in the alternative to, static trigger ordering described with reference to FIG. 6.

In conclusion, disclosed examples provide, among other things, robust and efficient systems and methods for linguistic scoring. Those skilled in the art can readily recognize that numerous variations and substitutions may be made to achieve substantially the same results as achieved by the examples disclosed herein. Accordingly, there is no intention to limit the scope of the coverage of this patent to the disclosed examples. Many variations, modifications and alternative constructions fall within the scope and spirit of the disclosed invention as expressed in the claims. For example, although thresholds are expressed in terms of whether a tally is greater than a predetermined threshold, the processes could be altered so that the test is whether the tally is greater than or equal to the predetermined threshold. In addition, although references are made to certain examples, all examples disclosed herein need not be separate. In other words, many of the features disclosed herein can be utilized in combinations not expressly illustrated.

The invention claimed is:

1. A method for linguistic analysis comprising:
setting a tally for a containing trigger equal to zero;
ordering a plurality of pre-requisite triggers based on decreasing absolute values of respective scores associated with the pre-requisite triggers; and
selecting one of the pre-requisite triggers based on the order;
determining, via a processor, whether the selected one of the pre-requisite triggers is a hit based on received data; and
if the selected one of the pre-requisite triggers is a hit, updating the tally by adding to the tally the score associated with the selected one of the pre-requisite triggers.

2. The method of claim 1, further comprising:
determining whether the updated tally less the sum of absolute values of scores associated with each unresolved trigger within the plurality of pre-requisite triggers is greater than a threshold; and
if the updated tally less the sum of absolute values of scores associated with each unresolved trigger within the plurality of pre-requisite triggers is greater than the threshold, resolving the containing trigger as a hit.

3. The method of claim 2, further comprising:
if the updated tally less the sum of absolute values of scores associated with each unresolved trigger within the plurality of pre-requisite triggers is not greater than the threshold, determining whether each of the pre-requisite triggers have been selected; and
if each of the pre-requisite triggers has been selected, resolving the containing trigger as a non-hit.

4. The method as defined in claim 3, further comprising, when each of the pre-requisite triggers has not been selected:
selecting a next one of the pre-requisite triggers based on the order;
determining whether the next one of the pre-requisite triggers is a hit based on the received data; and
if the next one of the pre-requisite triggers is a hit, updating the tally by adding to the tally the score associated with the next one of the pre-requisite triggers.

5. The method as defined in claim 2, wherein the unresolved trigger triggers are ones of the pre-requisite triggers that have not been selected for the received data.

6. The method as defined in claim 1, wherein determining whether the selected one of the pre-requisite triggers is a hit comprises comparing a score for the data with a score associated with the selected one of the pre-requisite triggers.

7. A computer readable storage disk or storage device comprising instructions which, when executed, cause a machine to at least:
set a tally for a containing trigger equal to zero;
order a plurality of pre-requisite triggers based on decreasing absolute values of respective scores associated with the pre-requisite triggers; and
select one of the pre-requisite triggers based on the order;
determine whether the selected one of the pre-requisite triggers is a hit based on received data; and
if the selected one of the pre-requisite triggers is a hit, update the tally by adding to the tally the score associated with the selected one of the pre-requisite triggers.

8. The computer readable storage disk or storage device of claim 7, wherein the instructions further cause the machine to:
determine whether the updated tally less the sum of absolute values of scores associated with each unresolved trigger within the plurality of pre-requisite triggers is greater than a threshold; and
if the updated tally less the sum of absolute values of scores associated with each unresolved trigger within the plurality of pre-requisite triggers is greater than the threshold, resolve the containing trigger as a hit.

9. The computer readable storage disk or storage device of claim 8, wherein the instructions further cause the machine to:
if the updated tally less the sum of absolute values of scores associated with each unresolved trigger within the plurality of pre-requisite triggers is not greater than the threshold, determine whether each of the pre-requisite triggers have been selected; and
if each of the pre-requisite triggers has been selected, resolve the containing trigger as a non-hit.

10. The computer readable storage disk or storage device as defined in claim 9, wherein, when each of the pre-requisite triggers has not been selected, the instructions further cause the machine to:
   select a next one of the pre-requisite triggers based on the order
   determine whether the next one of the pre-requisite triggers is a hit based on the received data; and
   if the next one of the pre-requisite triggers is a hit, update the tally by adding to the tally the score associated with the next one of the pre-requisite triggers.

11. The computer readable storage disk or storage device as defined in claim 9, wherein the unresolved triggers are ones of the pre-requisite triggers that have not been selected for the received data.

12. The computer readable storage disk or storage device as defined in claim 8, wherein instructions cause the machine to determine whether the selected one of the pre-requisite triggers is a hit by comparing a score for the data with a score associated with the selected one of the pre-requisite triggers.

* * * * *

UNITED STATES PATENT AND TRADEMARK OFFICE
CERTIFICATE OF CORRECTION

PATENT NO. : 8,620,642 B2  
APPLICATION NO. : 13/535332  
DATED : December 31, 2013  
INVENTOR(S) : Daisuke Baba and Charles Douglas Phillips It is certified that error appears in the above-identified patent and that said Letters Patent is hereby corrected as shown below:

In the Claims:

Column 11, line: 13:
replace "claim 9" with --claim 8--.

Column 11, line: 17:
replace "claim 8" with --claim 7--.

Signed and Sealed this
Eighteenth Day of March, 2014

Michelle K. Lee
*Deputy Director of the United States Patent and Trademark Office*